US011010607B2

(12) United States Patent
Birchbauer et al.

(10) Patent No.: US 11,010,607 B2
(45) Date of Patent: May 18, 2021

(54) METHOD FOR CONTROLLING UNMANNED AERIAL VEHICLES

(71) Applicant: Siemens Aktiengesellschaft, Munich (DE)

(72) Inventors: Josef Alois Birchbauer, Seiersberg (AT); Juergen Hatzl, Grafenschachen (AT)

(73) Assignee: Siemens Aktiengesellschaft, Munich (DE)

( * ) Notice: Subject to any disclaimer, the term of this patent is extended or adjusted under 35 U.S.C. 154(b) by 157 days.

(21) Appl. No.: 16/330,309

(22) PCT Filed: Sep. 5, 2017

(86) PCT No.: PCT/EP2017/072231
§ 371 (c)(1),
(2) Date: Mar. 4, 2019

(87) PCT Pub. No.: WO2018/046492
PCT Pub. Date: Mar. 15, 2018

(65) Prior Publication Data
US 2019/0205644 A1 Jul. 4, 2019

(30) Foreign Application Priority Data

Sep. 7, 2016 (EP) ..................................... 16187609

(51) Int. Cl.
*G06K 9/00* (2006.01)
*B64C 39/02* (2006.01)
*G01C 23/00* (2006.01)
*G05D 1/00* (2006.01)
*G05D 1/10* (2006.01)
*G06T 17/05* (2011.01)

(52) U.S. Cl.
CPC ........ *G06K 9/00637* (2013.01); *B64C 39/024* (2013.01); *G01C 23/00* (2013.01);
(Continued)

(58) Field of Classification Search
CPC .. G06K 9/00637; G05D 1/104; G05D 1/0094; G06T 17/05; G06T 17/00;
(Continued)

(56) References Cited

U.S. PATENT DOCUMENTS

| 7,411,196 B2 * | 8/2008 | Kalayeh ............... G01C 11/025 250/342 |
| 9,162,753 B1 | 10/2015 | Panto et al. |

(Continued)

FOREIGN PATENT DOCUMENTS

| DE | 102011017564 | 10/2012 |
| DE | 102014201238 | 7/2015 |

(Continued)

OTHER PUBLICATIONS

Office Action dated Jan. 23, 2020 issued in Canadian Patent Application No. 3,033,123.
(Continued)

*Primary Examiner* — Russell Frejd
(74) *Attorney, Agent, or Firm* — Cozen O'Connor

(57) ABSTRACT

A method for controlling an unmanned flying object (UAV) that is used to detect and measure objects in a specified region, where a largely obstacle-free flyover zone is determined for the region to be detected and measured, where the unmanned flying object takes overview measurements of the region utilizing suitable sensors and recording technology in the flyover zone, wherein a three-dimensional digital surface model of the region is ascertained together with the objects located therein based on the overview measurements, and based on the three-dimensional digital surface model, a sequence of positions for detailed measurements and an obstacle-free flight path are ascertained for an unmanned model aircraft for assuming the sequence of positions and are used as the basis for control of the unmanned model aircraft.

7 Claims, 4 Drawing Sheets

(52) U.S. Cl.
CPC ........... *G05D 1/0094* (2013.01); *G05D 1/104* (2013.01); *G06T 17/05* (2013.01); *B64C 2201/123* (2013.01); *B64C 2201/126* (2013.01); *G06T 2207/30184* (2013.01)

(58) Field of Classification Search
CPC ........ G06T 2207/30184; B64C 39/024; B64C 2201/123; B64C 2201/126; B64C 39/02; G01C 23/00
See application file for complete search history.

(56) References Cited

U.S. PATENT DOCUMENTS

| | | |
|---|---|---|
| 2014/0316616 A1 | 10/2014 | Kugelmass |
| 2014/0354809 A1 | 12/2014 | Shondel |
| 2016/0202695 A1 | 7/2016 | Deroos et al. |
| 2016/0212345 A1 | 7/2016 | Van Cruyningen |
| 2016/0341554 A1* | 11/2016 | Hillier .................. G08G 5/0013 |
| 2017/0285092 A1* | 10/2017 | Moore .................. G05D 1/0094 |
| 2017/0320570 A1* | 11/2017 | Horn ....................... B64C 29/02 |

FOREIGN PATENT DOCUMENTS

| | | |
|---|---|---|
| RU | 2562707 | 9/2015 |
| WO | WO 2015/110195 | 7/2015 |

OTHER PUBLICATIONS

International PCT Search Report based on PCT/EP2017/072231 dated Nov. 27, 2017.

\* cited by examiner

METHOD FOR CONTROLLING UNMANNED AERIAL VEHICLES

CROSS-REFERENCE TO RELATED APPLICATIONS

This is a U.S. national stage of application No. PCT/EP2017/072231 filed Sep. 5, 2017. Priority is claimed on EP Application No. 16187609 filed Sep. 7, 2016, the content of which is incorporated herein by reference in its entirety.

BACKGROUND OF THE INVENTION

1. Field of the Invention

The invention relates to a method for controlling unmanned aerial vehicles.

2. Description of the Related Art

In order to protect against external damage, gas and oil pipelines are monitored by pipeline walkers and/or by regular fly overs of the line by aircraft or helicopters. From the aerial view, even small leaks can be detected by any slight discolorations of the ground, which would not be noticed at all from the ground. Likewise, the setting up of building sites is visible here, and enquiries can be made locally as to whether the circumstances are known at the site and approval exists. The flight is associated with a certain degree of risk, however, and therefore accidents keep occurring.

It is particularly important to monitor pipelines in what are known as regions of mine subsidence. These are regions such as the northern Ruhr in Germany, for instance, where intensive mining has occurred close to the surface, and now large areas of the ground are slowly (although sometimes also suddenly) caving in and sinking. Obviously, any pipeline lying in the ground is taken too, so that it consequently sags and may be damaged. In the event of other ground movements, buckling of the pipeline may also occur. Some pipeline operators therefore employ surveyors to monitor such critical regions continuously. When a certain amount of buckling is exceeded, the pipeline must be dug up and cut through, and then a suitable piece inserted and/or cut out.

Unmanned aerial vehicles, or drones as they are known, are being used increasingly for monitoring gas and oil pipelines and also electrical lines from the air. These are cheaper than using a helicopter, are smaller and therefore more maneuverable, and usually no people are put at risk in the event of an accident.

In surveying and inspection tasks using unmanned aerial vehicles, the flying altitude is often a decisive factor in the quantity and quality of the acquired data. A greater flying altitude provides an overview and reduces the risk of collisions with obstacles, which is particularly important for the automatic or semiautomatic flight of the unmanned aerial vehicles based on preset routes.

On the other hand, some of the sensors used in the surveying and inspection tasks benefit from an acquisition distance or measurement distance that is as short as possible, because the data quality decreases with distance. Moreover, especially for elevated objects, a side view ("oblique"), ideally at acquisition angles that are as shallow as possible, is required in addition to the aerial view for inspection tasks.

SUMMARY OF THE INVENTION

In view of the foregoing, it is therefore an object of the invention to provide a method for controlling unmanned aerial vehicles, which method satisfies the above-described requirements.

This and other objects and advantages are achieved in accordance with the invention by a method that allows the automated monitoring and surveying of installations by autonomously flying unmanned aerial vehicles.

Especially advantageous applications are considered to be, in particular, monitoring and surveying a storage area and the objects (components) located therein, monitoring power lines, locating leaks in gas pipelines and/or measuring the layer thickness of soil above gas or oil pipelines laid underground.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in greater detail with reference to the exemplary figures, in which.

DETAILED DESCRIPTION OF THE EXEMPLARY EMBODIMENTS

Figure 1:
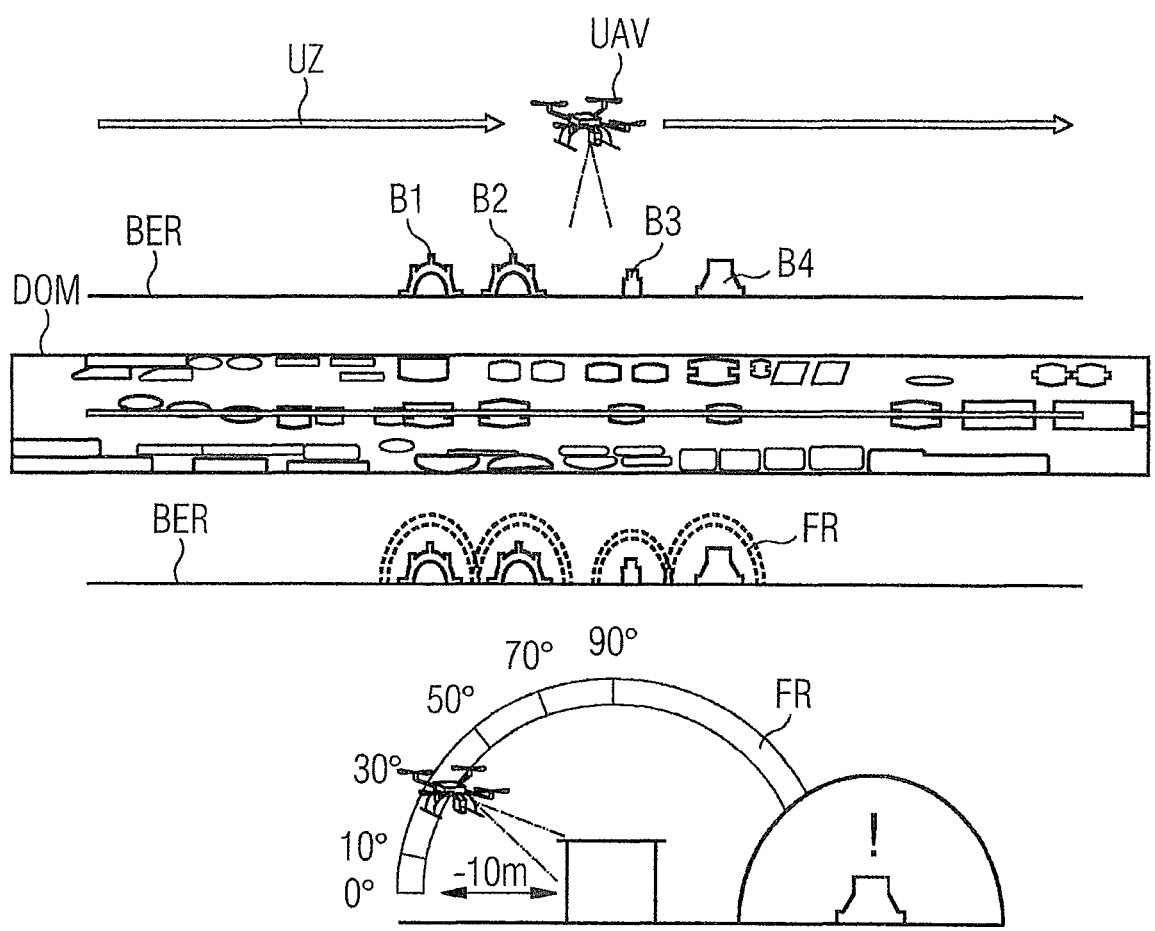
FIG. 1 shows the procedure of flying around a storage area in order to record assemblies or components kept in stock in accordance with the invention.

FIG. 1 shows schematically a storage area BR containing various components B1, B2, B3, B4. This storage area may be outdoors or may even be in a closed room, such as a warehouse.

Especially for large components B1, B2, B3, B4 of dimensions in the range of 5-10 m and above, near-ground recording and surveying quickly reach their limits. Consequently, the use of unmanned aerial vehicles comprising suitable sensors brings particular benefits, here.

It is thereby possible not only to locate and identify the components B1, B2, B3, B4 but also to survey these components very accurately and verify that they meet manufacturing tolerances, which is often the precondition for subsequent processing.

In this process, the measurement accuracy depends on the flying altitude and, in particular for components B1, B2, B3, B4 having a complex surface, also on the acquisition angle and the number of measurement points, and therefore acquisitions or measurement operations from different positions are needed to obtain optimal measurement results.

The flight movements that this necessitates increase the risk of collisions with objects in the surroundings.

The method in accordance with the invention provides that an unmanned aerial vehicle used to record and survey objects in a storage area is now controlled in the manner that first, a largely obstacle-free flyover zone UZ is defined for the region to be recorded and surveyed, in which zone the unmanned aerial vehicle UAV performs overview measurements of the storage area BR using suitable sensors and acquisition techniques.

This obstacle-free flyover zone UZ is preferably provided at a height at which even the objects B1, B2, B3, B4 expected to be highest are flown over. If the storage area has a roof, the flyover zone UZ will be provided below the roof or below elements fitted on the roof, for instance, elements such as lighting units.

A first flight and overview survey of the storage area BR is performed in this zone.

Then an overview model of the storage area including the objects located therein is determined based on the results of the overview measurements.

The model is preferably a three-dimensional digital surface model DOM, which can be created, for example, from overlapping photographs at different positions using photogrammetry techniques, or by laser surveying (LiDAR).

Based on this overview model DOM, a sequence of positions for detailed measurements and an obstacle-free flight route FR for an unmanned aerial vehicle UAV for adopting the sequence of positions are determined. This route is taken as a basis for controlling the unmanned aerial vehicle UAV.

It can be advantageous here if the overview measurements and the detailed measurements are performed by different unmanned aerial vehicles UAV. This is particularly the case because then the unmanned aerial vehicles UAV can be equipped with different sensors and, if applicable, overview measurements and detailed measurements can be performed using different techniques. It would also be conceivable here to use small and maneuverable unmanned aerial vehicles UAV for the detailed measurements, which is advantageous especially in confined spaces.

Furthermore, the survey time can be shortened by the parallel use of a plurality of unmanned aerial vehicles UAV, something that constitutes another considerable advantage in particular for applications in which the components B1, B2, B3, B4 have only a short storage period, i.e., the time the components take to pass through the store is relatively small.

Known routing algorithms can be used to optimize the route FR in terms of various parameters, such as the time involved, the energy consumption or even the risk of collision.

Another preferred application of the method according to the invention is explained with reference to FIG. 2.

Figure 2:
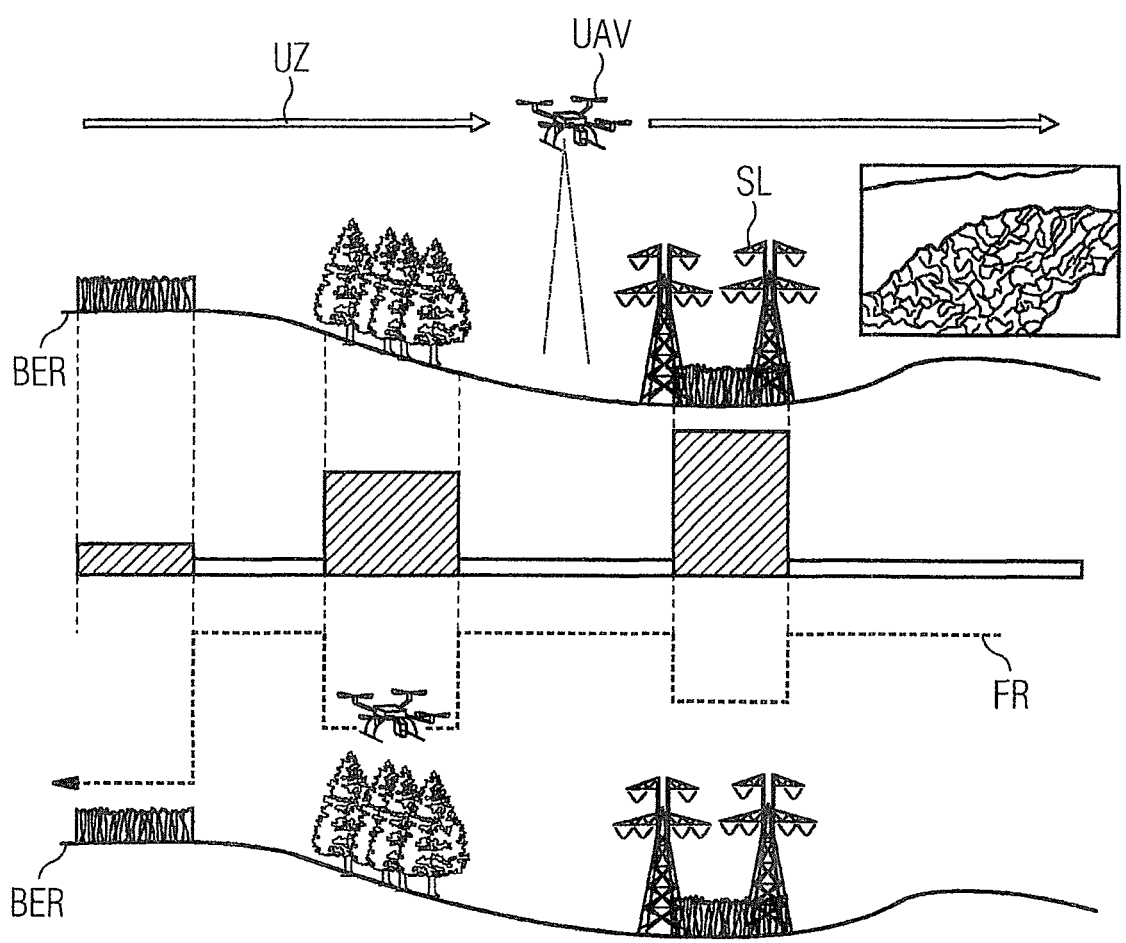
FIG. 2 shows the procedure of flying along a high-voltage power line in accordance with the invention.

The diagram of FIG. 2 shows the region around two electrical high-voltage lines HL in the form of overhead lines.

Having dimensions of many kilometers in length and a height of approximately 60 meters means that monitoring these overhead lines is a task that is usually performed by helicopters.

The use of unmanned aerial vehicles UAV can significantly reduce the costs of the flight and, hence, it is possible to increase the frequency of the monitoring flights and raise the monitoring quality.

In accordance with the invention, the terrain in question is flown over at an obstacle-free height and, for example, photographed or scanned using LiDAR.

In addition to acquisitions in the visible region of light, acquisitions in the near-infrared region or using thermal infrared are advantageous for certain applications. For instance, near-infrared at a wavelength of 780 nm to 3 µm (spectral bands IR-A and IR-B) is particularly well-suited to detecting vegetation, because in the near-infrared region, chlorophyll has a reflectivity that is higher than in the visible spectrum by approximately the factor 6. This effect can be exploited for detecting vegetation by making an acquisition in the preferably red spectrum of the visible region, and another acquisition in the near-infrared. Wanted objects have an approximately equal reflectivity both in the visible region and in the near-infrared region, whereas vegetation containing chlorophyll has a significantly higher reflectance in the near-infrared. It is hence possible, for instance, to distinguish even green wanted objects from similarly green vegetation.

Thermal infrared, on the other hand, can be used for ascertaining leaks in pipelines, at which liquids or gases are escaping at a higher temperature than the environment.

In addition, for high-voltage lines, the temperature of the line cable can indicate a fault, and therefore a thermal infrared acquisition can provide useful data.

From the acquired data and the positions of the unmanned aerial vehicle UAV, which positions are determined, for instance, using global satellite navigation systems, a three-dimensional digital surface model DOM is subsequently generated as the overview model.

As an alternative to, or in addition to, satellite navigation systems, it is conceivable to use magnetometers, inertial measurement systems (IMU) and barometric sensors for position determination.

What are known as "points of interest", such as thermally conspicuous points or predetermined fault-prone line elements, such as insulators, are defined from an analysis of the overview model, and associated suitable positions for detailed measurements are identified.

The choice of position must take into account not only the measurement methods used and resultant distances and angles with respect to the object under measurement, but also safety requirements, so that not only is the quality of the obtained data optimized but also the likelihood of collision of the unmanned aerial vehicle UAV, or the risk thereto, is minimized when flying to and from the position.

For instance, for a high-voltage line in operation, it is necessary to take into account the electrical field strengths and magnetic fields, which might influence or impair the measurement devices or the electronics of the unmanned aerial vehicle UAV.

Furthermore, the vegetation in the form of trees or shrubs also forms obstacles and hazards for the flight.

Conventional routing techniques are used to determine from this data a sequence of positions for detailed measurements and an obstacle-free route FR for an unmanned aerial vehicle UAV for adopting the sequence of positions.

Figure 3:
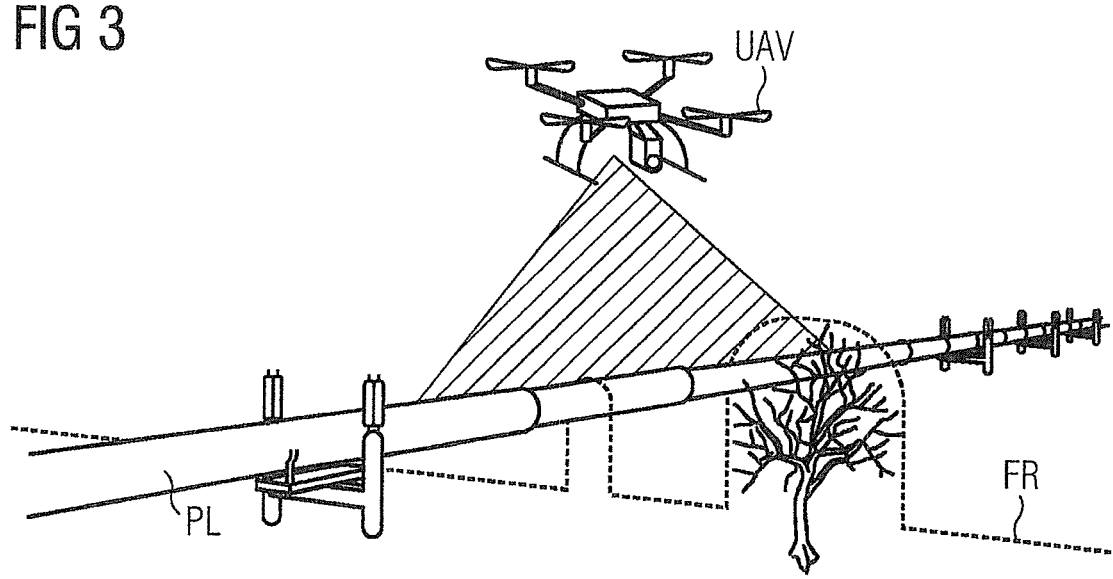
FIG. 3 shows the overview survey of an aboveground pipeline supported on stands in accordance with the invention.

The positions for detailed measurements may be defined by the geometry of the object. For instance, flying around the lines in a vertical loop lends itself to high-voltage lines SL or, as shown in FIG. 3, to pipelines PL mounted above ground on stands.

It can be advantageous to use a plurality of unmanned aerial vehicles UAV having different equipment.

Thus, for instance, fixed-wing aircraft, which can achieve high speeds and cover large distances, can be used for the overview measurements from the largely obstacle-free flyover zone UZ.

The detailed measurements, on the other hand, can be performed using aircraft such as multicopters, for instance, which are particularly maneuverable and, by virtue of their ability to hover, also facilitate other measurement techniques.

In addition, the unmanned aerial vehicles UAV can also be equipped with different measuring devices.

It can also be advantageous to coordinate the use of a plurality of unmanned aerial vehicles UAV with one another, for instance, so that each unmanned aerial vehicle UAV is assigned a specific segment of a high-voltage line SL. This assignment can also be made dynamically, for example, according to the wind conditions and the particular ranges of the unmanned aerial vehicles UAV.

Figure 4:
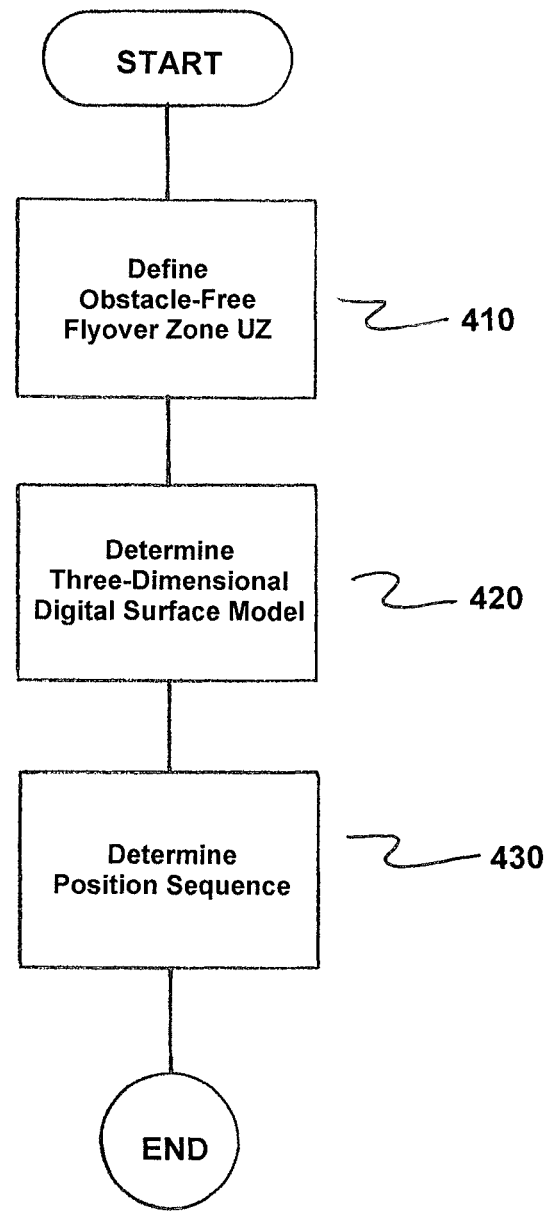
FIG. 4. is a flowchart of the method in accordance with the invention.

FIG. 4 is a flowchart of the method for controlling an unmanned aerial vehicle UAV that records and surveys objects in a specified region. The method comprises defining an obstacle-free flyover zone UZ for a region BER to be recorded and surveyed, as indicated in step 410. In accordance with the invention, the unmanned aerial vehicle UAV performing overview measurements of the region BER utilizing suitable sensors and acquisition techniques in the obstacle-free flyover zone UZ.

Next, a three-dimensional digital surface model DOM of the region BER including the objects located in the specified zone is determined based on the overview measurements, as indicated in step 420.

Next, a sequence of positions for detailed measurements and an obstacle-free flight route FR for an unmanned aerial vehicle UAV for adopting the determined sequence of positions is determined based on the three-dimensional digital surface model DOM, as indicated in step 430. In accordance with the invention, the obstacle-free flight route FR being taken as the basis for controlling the unmanned aerial vehicle UAV.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for controlling an unmanned aerial vehicle which records and surveys objects in a specified region, comprising:
    defining an obstacle-free flyover zone for a region to be recorded and surveyed, the unmanned aerial vehicle performing overview measurements of the region utilizing suitable sensors and acquisition techniques in a visible light region and one of (i) near-infrared region and (ii) thermal infrared within the obstacle-free flyover zone;
    determining a three-dimensional digital surface model of the region including the objects located in the specified zone based on the overview measurements; and
    determining, based on the three-dimensional digital surface model, a sequence of positions for detailed measurements and an obstacle-free flight route for an unmanned aerial vehicle for adopting the determined sequence of positions, said obstacle-free flight route being taken as a basis for controlling the unmanned aerial vehicle.

2. The method as claimed in claim 1, wherein as the specified region, a storage area containing various components or assemblies is recorded and surveyed by the unmanned aerial vehicle.

3. The method as claimed in claim 1, wherein the object to be recorded and surveyed comprises an electrical power line.

4. The method as claimed in claim 1, wherein the object to be recorded and surveyed comprises a pipeline for liquids or gases.

5. The method as claimed in claim 1, wherein the three-dimensional digital surface model of the region is produced from overlapping photographs.

6. The method as claimed in claim 1, wherein the three-dimensional digital surface model of the region is produced from laser surveying measurements of the unmanned aerial vehicle.

7. The method as claimed in claim 1, wherein a plurality of unmanned aerial vehicles having different equipment are utilized.

* * * * *